United States Patent [19]

Li et al.

[11] B 4,001,109

[45] Jan. 4, 1977

[54] DEMULSIFICATION PROCESS

[75] Inventors: Norman N. Li, Edison; Taras Hucal, Iselin; Robert P. Cahn, Millburn, all of N.J.

[73] Assignee: Exxon Research & Engineering Co., Linden, N.J.

[22] Filed: Nov. 19, 1974

[21] Appl. No.: 525,204

[44] Published under the second Trial Voluntary Protest Program on March 16, 1976 as document No. B 525,204.

[52] U.S. Cl. .............................. 210/22 R; 210/21
[51] Int. Cl.² ................. B01D 13/00; B01D 11/00
[58] Field of Search .................. 210/21, 22, 40, 65; 208/188; 252/319, 320, 326, 327, 328, 331

[56] References Cited
UNITED STATES PATENTS 3,436,342  4/1969  Fujiwara et al. ..................... 210/21

Primary Examiner—Frank A. Spear, Jr.
Attorney, Agent, or Firm—Robert J. Baran

[57] ABSTRACT

This invention relates to a process for demulsifying an emulsion which can be either of the water-in-oil or oil-in-water type, which comprises mixing the emulsion with a mixture of two or more comiscible volatile solvents, at least one of which is miscible with the water and at least one of which is miscible with the oil, thereby causing the separation of the emulsion into an oil and a water layer. Preferably, the water-miscible solvent is an alcohol and the oil-miscible solvent is a light hydrocarbon, more preferably, a saturated hydrocarbon or a monoolefin. Since it is generally desirable to recover the solvent for reuse in emulsion breaking, the oil-miscible solvent will have a boiling point of at least 50° C. less than the boiling point of the oil. In the most preferred embodiment, a mixture of isopropanol and cyclohexane are mixed with an equal volume of a water-in-oil emulsion, said oil comprising high boiling hydrocarbons for a time sufficient to separate the emulsion into separate oil and water layers, said oil and water layers are then separated and distilled to recover the isopropanol and the cyclohexane.

9 Claims, No Drawings

DEMULSIFICATION PROCESS

FIELD OF THE INVENTION

This invention relates to a process for demulsifying an emulsion which can be either of the water-in-oil or oil-in-water type, which comprises mixing the emulsion with a mixture of two or more comiscible volatile solvents, at least one of which is miscible with the water and at least one of which is miscible with the oil, thereby causing the separation of the emulsion into an oil and a water layer. Preferably, the water-miscible solvent is an alcohol and the oil-miscible solvent is a light hydrocarbon, more preferably, a saturated hydrocarbon or a monoolefin. Since it is generally desirable to recover the solvent for reuse in emulsion breaking, the oil-miscible solvent will have a boiling point of at least 50°C. less than the boiling point of the oil. In the most preferred embodiment, a mixture of isopropanol and cyclohexane are mixed with an equal volume of a water-in-oil emulsion, said oil comprising high boiling hydrocarbons for a time sufficient to separate the emulsion into separate oil and water layers, said oil and water layers are then separated and distilled to recover the isopropanol and the cyclohexane.

BACKGROUND OF THE PRIOR ART

Various emulsions are known in the art to be difficult to separate. For example, crude oil sometimes contains varying amounts of emulsified water which must be removed before further processing thereof. Because of the surface activity and the high viscosity of said crude oil, it is very difficult to break these emulsions to remove the water. Various methods have been tried, including heating, electrostatic precipitation, filtration, coalescense, addition of solvents and diluents, and centrifugation. In U.S. Pat. No. 1,472,384, a process for the demulsification of crude oil is disclosed, which relies on the use of a solvent which is miscible with water and to an extent the oil. The patentee discloses that methanol, ethanol and acetone may be used as the solvent. In one embodiment of the invention, the patentee treats his separated oil after the demulsification process by heating to remove the dissolved solvent and also various lighter hydrocarbons which he returns for use in demulsification of other crude oil emulsions. The patentee notes that the lighter hydrocarbons in admixture with his solvent formed an improved demulsification mixture since said lighter hydrocarbons increased the fluidity of the crude oil. The instant invention differs from this process in the following ways.

While patentee recognized that a mixture of (alcohol or ketone) solvent and light hydrocarbon formed an improved demulsification mixture, he utilized only light hydrocarbons present in his emulsion feed for this purpose. By vaporization, condensation and recycle, he was able to build up the amount of light hydrocarbon in his demulsification mixture to a desired, though unspecified amount.

This technique introduces very undesirable separation problems into the steps following the emulsion breakage, namely, the distillation operations wherein the demulsification mixture of solvent and hydrocarbon are recovered. The oxygenated solvents and light hydrocarbons used by the patentee form azeotropes with each other and ternary azeotropes with water, so that the final separation of demulsification mixture and separated emulsion becomes difficult and expensive.

In order to avoid this difficulty, and further to increase the flexibility of choosing preferred components for the demulsification mixture, it is important to employ constituents in the demulsification mixture which boil far enough below the nonaqueous constituents of the emulsion to be broken, so that there is no fractionation problem and no tendency to form azeotropes. Consequently, preferred light hydrocarbons and alcohols can be employed singly or in combination to break the emulsion without incurring a prohibitive process debit to separate this demulsification solvent from the product oil or water phase.

Finally, the patentee worked with crude oil emulsions and thus did not discuss the demulsification of oil in water emulsions.

In U.S. Pat. No. 2,287,567, a mixture of naphthalene and carbolic acid dissolved in kerosene or stove oil is taught for use in demulsifying crude oil emulsions. U.S. Pat. No. 1,980,118 teaches the use of water insoluble alcohols for the same purpose.

Water-in-oil emulsions occur during the use of various lubricating oils. U.S. Pat. No. 2,376,418 teaches the addition of isopropanol in a light bodied mineral oil or benzol carrier to a lubricating oil to promote the agglomeration of emulsified water. The teachings of this reference differ from the process of the instant invention in one important aspect. Because of the low amounts of water likely to be emulsified in the lubricating oil, the patentee needs as little as a half percent isopropanol to cause agglomeration. Furthermore, the patentee because his process includes a filtration step does not need nor does he recognize the importance of using larger amounts of isopropanol to effect rapid demulsification, i.e., the separation of the water-in-oil emulsion into separate layers.

Other references which disclose the use of a solvent to break water-in-oil emulsions include U.S. Pat. No. 2,036,299 wherein a $C_4$ to $C_8$ alcohol is used to break emulsions of dilute sludge acids which results from the refining of lube oils with sulfuric acid, and U.S. Pat. No. 2,270,837 which relates to the use of isopropanol and water to break Stoddard's solvent emulsions.

SUMMARY OF THE INVENTION

It has now unexpectedly been discovered that an improved process for the demulsification of oil and water emulsions, either of the water-in-oil or oil-in-water types, comprises mixing said emulsion with a mixture of two or more comiscible, volatile solvents, at least one of which is miscible with water and at least one of which is miscible with said oil, thereby causing the separation of the emulsion into an oil and water layer. This process is especially suitable for breaking emulsions wherein water is emulsified in a heavy hydrocarbon, for example, in crude oil emulsions and in liquid membrane emulsions which are defined in U.S. Pat. No. 3,779,907.

It is known in the art that various emulsions are difficult to break. As mentioned above, one type of a difficult to break emulsion includes crude oil emulsions. Another type of emulsion which is difficult to break is the emulsions used in the various liquid membrane processes. The liquid membrane water treating process to function effectively requires a water-in-oil emulsion wherein the oil maintains its integrity as the continuous phase of the emulsion under various conditions of heat, pressure and agitation in order to function as a membrane. Thus, the emulsions useful in this process are designed to be especially stable. The formation of stable liquid membrane emulsions is an art in itself and the difficulties and solutions to said difficulties may be found in U.S. Pat. No. 3,779,907 herein incorporated by reference to define one class of emulsions which are especially suitable for breaking (by the process of the instant invention). As may be read from this patent, the liquid membrane emulsion will comprise a reagent containing water phase emulsified in an oil phase, said oil phase comprising a surfactant and preferably various polar additives which have the effect of increasing the stability of the emulsion by (1) increasing the viscosity of the hydrocarbon phase, and (2) increasing the amount of surfactants used in forming the emulsion. These emulsions, while suitable for liquid membrane processes because of their stability, are to a great extent problematic when it comes to the breaking thereof to separate the oil and water phases for separate reclamation of the components present therein. Prior art emulsion breaking processes which include heating, polyvalent flocculating salts, electrostatic precipitation, centrifuging, are completely unsuitable for breaking these emulsions.

It has now been found and is the subject matter of this invention that the addition of a mixture of two or more comiscible volatile solvents having the miscibility parameters described above effectively break these liquid membrane emulsions so that the oil and water phases may be separated and processed further or recycled as required.

Preferably, the solvent which is miscible with the oil is a low boiling hydrocarbon or chlorinated hydrocarbon. It should be noted that for ease of separation of the oil, this solvent will be chosen so as to have a boiling point of more than 30°C. lower, more preferably more than 50°C. lower than the boiling point of the oil. This solvent will also be selected on the basis of its inability to form azeotropic mixtures with any of the constituents of the oil phase, thus causing further separation problems downstream. Examples of the oil miscible solvents within the scope of the instant invention include paraffins, naphthenes, and aromatics, especially in the $C_4$ to $C_8$ range and chlorinated and fluorinated hydrocarbons in the $C_1$ to $C_4$ range. Specific examples include benzene, toluene, dichloroethane, etc.

Preferably, the solvent is a paraffinic hydrocarbon which may be straight chain, branched or cyclic. For example, oil-miscible solvents which are preferably used in the process of the instant invention include cyclohexane, cyclopentane, cycloheptane, cyclohexene, hexane, pentane, heptane, etc. Most preferably, the solvent is cyclohexane.

The water-miscible solvent is preferably an alcohol or ketone, for example, a $C_1$ to $C_4$ alcohol or a $C_3$ to $C_5$ ketone. The alcohol or ketone may be straight chain, branched or cyclic. In general, the alcohol or the ketone will have a boiling point of less than 150°C., preferably less than 80°C. Examples of alcohol which may be used include methanol, ethanol, isopropanol, butanol, etc. Examples of ketones include acetone, methylethyl ketone, etc.

The two solvents are selected so as to form a comiscible mixture. The two solvents may be chosen on the basis of forming a low boiling binary azeotrope with each other or ternary azeotrope with small amounts of water. This makes their recovery from the demulsified emulsion phases particularly easy because of the decreased fractionation requirements. Since the solvent after recovery from the separated emulsion is immediately recycled to break fresh emulsion, there is no need to separate any azeotrope between the solvent constituents. Small amounts of water present in ternary azeotropes are not detrimental in a recycle operation, and may actually help in the removal of water from the system.

In general, the ratio of the water-miscible solvent with the oil-miscible solvent may vary from 1/9 to 9/1, preferably from 1/3 to 3/1 on a weight basis. This is substantially similar to the ratio of water to oil in the emulsion which is to be broken.

The solvent is added to the emulsion at a ratio of from 1/9 to 9/1, preferably from 1/2 to 2/1. In general, for rapid demulsification, the volume of solvent and emulsion is adjusted to be substantially equivalent. The ratio of the water-miscible solvent to total solvent mixture is also adjusted to be substantially equivalent to the ratio of water to oil present in the emulsion.

The emulsion is contacted with the solvent under conditions which promote demulsification. For example, contacting will preferably take place under the conditions of agitation. The contacting zone and agitation means known in the art can be used in this demulsification step. More than one contacting zone in series may be used. The temperature and pressure may vary from the freezing point of any of the components in the emulsion or the solvent up to the boiling point thereof. In general, higher temperatures promote more rapid demulsification. However, the temperature must be maintained below a level at which flashing of the solvent will occur so as to obtain the best results with the solvent in the demulsification zone. After agitation for a time sufficient to ensure adequate contact between the solvent and the emulsion, the agitation is terminated, or in a continuous process the mixture is fed to a settler or a centrifuge. At this point, separation into an oil and water layer should occur. There may be more than two layers under some conditions but preferably there will only be two layers. Three layer systems, because the third layer comprises mixtures of both oil and water components, are to be avoided, since they are more difficult to efficiently separate. One exception to this generalization is the formation of a third, but solid phase which crystallizes out of the aqueous layer due to the salting out effect of the water-miscible solvent component of the demulsification mixture. In certain processes employing liquid membrane separation, formation of such crystals can be utilized in reworking the aqueous phase for recycle to the liquid membrane separation. The oil and water layer are separated by means known in the art, for example, in a batch operation the oil may be decanted, while in a continuous operation a liquid-liquid settling drum may be employed.

Oil and water layers are separately treated to remove the volatile solvents. The solvents, because of their volatility, may generally be removed from the water or oil simply by heating and flashing in a batch or continuous operation. The solvents are then condensed and recycled for use. The water layer which in an emulsion useful in a liquid membrane process will comprise the reaction products of the reagent present in the internal phase, as described in U.S. Pat. No. 3,779,907, and the permeable component which is removed by reaction therewith is further processed for reuse or discarded. The oil phase will contain the hydrocarbons used in forming the emulsion, polar additives and surfactants, again as described in the above patent.

In a manner similar to that described above for treating liquid membrane emulsions, the process of the instant invention may be used in breaking crude oil emulsions and the emulsions formed from the deballasting of oil tankers.

More than one oil-miscible or water-miscible solvent may be used in the process of the instant invention, providing the various constituents of the demulsifying solvent mixture boil reasonably close together, such as within 50°C. of each other, in order to simplify their recovery by distillation. As mentioned previously, azeotrope formation between the various constituents of the solvent assists in the overall recovery scheme, as long as there are no azeotropes between constituents of the oil phase and constituents of the solvent.

Of course, there should be no possible chemical reaction between any of the solvent constituents themselves or with any constituents of the emulsion to be separated. Esters are unsatisfactory solvents due to their hydrolysis under conditions of demulsification and stripping.

It should be noted, that while not preferred, the components of the demulsifying solvent can be added to the emulsion which is to be broken, serially.

The following are specific embodiments of the instant invention.

EXAMPLE 1 — Demulsification of a Liquid Membrane Emulsion

In this experiment, an emulsion which comprises 2 percent SPAN-80, a sorbitan monooleate, 4 percent of a polyamine additive, The results are disclosed in Table I below.

TABLE I

DEMULSIFICATION BY USE OF C.I.A.

Emulsion Composition:
External (membrane) phase — 2% span-80, 4% amine, 94% isoparaffin
Internal (reagent) phase — 7.5% $(NH_4)_2 CO_3$ in water
The emulsion was used to contact an aqueous solution of 0.5% (by wt.) acetic acid

| wt. ratio C/IA | E/CIA | 1/2 | 1/1 | 2/1 |
|---|---|---|---|---|
| 25/75 | | $CD_1 CD_2$ | $CD_3$ | |
| 50/50 | | $CD_1 CD_1$ | $CD_2$ | |
| 75/25 | | $CD_1 CD_1$ | $CD_3$ | |

E = emulsion
C = cyclohexane
I.A. = Isopropyl Alcohol
$CD_1$ = Complete demulsification with rapid separation of two phases (no more than 2–3 min.)
$CD_2$ = Complete demulsification with slow phase separation (3–60 min.).
$CD_3$ = Complete demulsification with slow phase separation (in hours).
ND = No demulsification.
PD = Partial demulsification.
AD = After many days.

Note that at a weight ratio of emulsion to solvent of 1 or less complete demulsification is effected in less than 3 minutes. Note also that when the weight ratio of spent emulsion to solvent is up to 2.0 the ratio of cyclohexene to isopropanol becomes more critical. For example, a 50/50 ratio effected complete demulsification but even that more effective ratio required up to 60 minutes to complete the phase separation. Ratios of 25/75 and 75/25 of cyclohexane to isopropanol effected complete demulsification only after hours of standing.

$$H - \underset{\underset{CH_3}{|}}{\overset{\overset{CH_3}{|}}{C}} - \left[ \underset{\underset{CH_3}{|}}{\overset{\overset{CH_3}{|}}{C}} - \right]_m - \underset{\underset{HC\!=\!\!=\!\!C}{\overset{H}{|}}\underset{H\;\;\;O}{|}}{\overset{H}{\underset{|}{C}}} - C \overset{\nearrow O}{\underset{\searrow N}{}} - \left[ CH_2 - CH_2 - N - \underset{CH_3}{\overset{O}{\underset{\|}{C}}} \right]_4$$

wherein m is an integer of about 40, and 94 percent by weight of a high boiling isoparaffin, having an average carbon number of about 35, as the oil phase and 7.5 weight percent ammonium carbonate in water as the aqueous phase, in a weight ratio of oil to water of 1.2, was contacted with an aqueous acetic acid solution. The aqueous acetic acid solution contained 0.5 weight percent acetic acid. After a contact time of 1 hour, approximately 86 percent of the acetic acid was removed therefrom. The weight ratio of emulsion to acetic acid solution was 0.32. The spent emulsion was contacted at various ratios of emulsion to solvent with a mixed solvent containing varying ratios of cyclohexene and isopropyl alcohol (C.I.A.).

The agitation during contacting was provided by hand-shaking in a separatory funnel. As the amounts of samples used in all the tests were small (10 g emulsion, amount of C.I.A. varied from 5 to 20 g), the mixing of the emulsion and C.I.A. was completed after 6 shakes. All tests were done at room temperature.

EXAMPLE 2

An emulsion comprising the same oil phase as in Example 1 and the same water to oil ratio but with an aqueous phase comprising 2 percent by weight sulfuric acid and 18 percent by weight ammonium sulfate in water was used to contact an ammonia-containing aqueous solution. This solution contained 56 ppm ammonia. The weight ratio of the ammonia solution to the emulsion was 2. After a contacting time of 15 minutes at a temperature of 25°C, the ammonia was substantially removed. In a manner similar to Example 1 this spent emulsion was demulsified with various solvents. These results are reported in Table II below. Note again the most effective solvent for demulsification of this liquid membrane emulsion was a mixture of cyclohexane and isopropyl alcohol.

Isopropyl alcohol alone could not break the emulsion. The formation of 3 phases in Test 14 is a result of the complex phase diagram of the solvent/emulsion system.

TABLE II

| TEST NO. | DEMULSIFYING SOLVENT (D.S.) | E/D.S. WT. R. | DEMULSIFICATION RESULT |
|---|---|---|---|
| 1 | C.I.A. (50 C/50 IA) | 1/1 | $CD_1$ |
| 2 | Toluene/$CH_3OH$ (50/50) | 1/2 | ND |
| 3 | C/$C_2H_5OH$ (50/50) | 1/2 | PD (80%) |
| 4 | 2,4,dimethyl pentane/IA (50/50) | 1/2 | PD (90%) |
| 5 | 2,4,dimethyl pentane/ethyl alcohol (50/50) | 1/2 | PD (90%) |
| 6 | Cyclohexane/butyl alcohol (50/50) | 1/2 | ND |
| 7 | Cyclohexane/IA (75/25) | 1/2 | PD (90%) |
| 8 | Cyclohexane/IA (75/25) | 1/1 | $CD_1$ |
| 9 | Cyclohexane/IA (75/25) | 2/1 | ND |
| 10 | Cyclohexane/IA (25/75) | 1/2 | PD |
| 11 | Cyclohexane/IA (25/75) | 1/1 | PD |
| 12 | Cyclohexene/IA (25/75) | 2/1 | ND |
| 13 | Cyclohexene/IA (50/50) | 1/2 | $CD_1$ |
| 14 | Cyclohexene/IA (50/50) | 1/1 | $CD_1$ (3 phases) |
| 15 | Cyclohexene | 2/1 | PD | being 1.0, was contacted with decane which is a solvent for the permeates. This example demonstrates use of the process of the instant invention for the demulsification of oil-in-water emulsions. This also is a liquid membrane type emulsion and is similar to that described in U.S. Pat. No. 3,410,794 and specifically in U.S. Pat. No. 3,696,028. Note once again the efficiency of the mixture of cyclohexene and isopropanol especially wherein the weight ratio of emulsion to solvent was 1 or less. Also note that using a single solvent, such as isopropanol in this case, to break the emulsion is not desirable, because it apparently solubilizes the entire emulsion, thus resulting in one phase solution. In this way, the purpose of recovering the membrane phase and the encapsulated internal phase separately is not achieved. See Table IV.

TABLE IV

| TEST NO. | DEMULSIFYING SOLVENT (D.S.) | E/D.S. WT. R. | DEMULSIFICATION RESULT |
|---|---|---|---|
| 1 | C/IA (50/50) | 1/2 | $CD_1$ |
| 2 | C/IA (50/50) | 1/1 | $CD_1$ |
| 3 | C/IA (50/50) | 2/1 | PD (about 80% breakup) |
| 4 | C | 1/2 | ND |
| 5 | IA | 1/2 | $CD_1$, one phase |
| 6 | IA | 1/1 | $CD_1$, one phase |
| 7 | Acetone | 1/2 | ND |

EXAMPLE 3

In this experiment, an emulsion which comprised the same oil phase as described above for Examples 1 and 2, and the same water to oil ratio, but an aqueous phase comprising 5 percent sodium hydroxide in water is described. This emulsion was used to remove acetic acid from an aqueous solution containing 0.1 weight percent acetic acid. After contacting for 20 minutes at a temperature of 25°C., the acetic acid in solution was substantially removed. The weight ratio of acetic acid solution to emulsion was 3:1. This spent emulsion was then demulsified by mixing with various demulsifying solvents. Note that in Tests 1–3, various cycloparaffins were used in combination with isopropanol. In all cases, substantially complete demulsification occurred within minutes. In Runs 4–6 wherein isobutanol was substituted for the isopropanol demulsification while essentially complete took longer. See Table III.

EXAMPLE 5

As described above, the process of the instant invention is especially suitable in breaking liquid membrane emulsions which are known in the art to be very stable. However, it is also important that after breaking of the emulsion that the surfactant solution be capable of reuse without substantial separation. In this process, a liquid membrane type emulsion was demulsified and the surfactantcontaining solution mixed with fresh reagent to form a new liquid membrane emulsion. This emulsion was subsequently used in a liquid membrane process and found to be just as effective as the original emulsion.

A liquid membrane emulsion comprising 300 grams of oil phase, said oil phase comprising 2 weight percent Span 80, 3 weight percent of the polyamine additive described in Example 1, 3 weight percent LA-1[(1)], 3 weight percent LA-2[(2)] and 89 percent of a high molec-

TABLE III

| TEST NO. | DEMULSIFYING SOLVENT (D.S.) | E/D.S. WT. R. | DEMULSIFICATION RESULT |
|---|---|---|---|
| 1 | C/IA (50/50) | 1/2 | $CD_1$ (3 phases) |
| 2 | Methyl cyclo $C_6$/IA (50/50) | 1/2 | $CD_1$ |
| 3 | Cyclo $C_5$/IA (50/50) | 1/2 | $CD_1$ |
| 4 | C/isobutyl alcohol (50/50) | 1/2 | $CD_2$ |
| 5 | Methyl cyclo $C_6$/isobutyl alcohol (50/50) | 1/2 | $CD_2$ |
| 6 | Cyclo $C_5$/isobutyl alcohol (50/50) | 1/2 | $CD_2$ |

EXAMPLE 4

In this experiment an emulsion comprising 0.2 percent saponin, 70 weight percent glycerol, and 29.8 percent water as the exterior phase and a 50:50 weight mixture of toluene and heptane as the interior phase, the weight ratio of the exterior and interior phases ular weight isoparaffin solvent and 250 grams of 1 percent by weight of sodium hydroxide in water was contacted with an aqueous potassium chromate solution comprising 0.1 weight percent potassium chromate. Total weight of the chromate solution was 900 grams. The liquid membrane emulsion was stirred with the chromate solution for various times at a temperature of 25°C. and at a temperature of 25°C. and at 350 rpm. The results are shown below.

[1]LA-1 is n-dodecenyl trialkyl methyl amine, made by Rohm and Haas.
[2]LA-2 is n-lauryl trialkyl methyl amine, made by Rohm and Haas.

TABLE V

| REUSE OF DEMULSIFIED SURFACTANT SOLUTION | |
|---|---|
| Mixing Time (Min.) | Cr Concentration in Feed (ppm) |
| 0 | 270 |
| 5 | 210 |
| 10 | 57 |
| 15 | 12 |
| 20 | 6 |
| 25 | 4 |
| 30 | 3 |

The emulsion was separated after 30 minutes from the chromate solution. 223 grams of emulsion were recovered and completely demulsified by mixing with 446 grams of an equal weight mixture of cyclohexane and isopropanol. The oil and the water layers were separated and heated to vaporize the volatile solvent (cyclohexane and isopropanol). 105 grams of the oil were obtained and 105 grams of an aqueous phase were obtained. The recovered oil was mixed with fresh reagent to make a new emulsion. 195 grams of emulsion were mixed with 600 grams of fresh chromate solution at 25°C. and 200 rpm. The results in using this liquid membrane emulsion to remove chromate are shown in Table VI below. Note that this emulsion is equally effective as the original emulsion was.

TABLE VI

| Mixing Time (Min.) | Cr Concentration in Feed (ppm) |
|---|---|
| 0 | 380 |
| 5 | 300 |
| 10 | 210 |
| 15 | <2 |
| 20 | <2 |
| 30 | <2 |
| 50 | <2 |

EXAMPLE 6

In this example, various emulsions which represent stable liquid membrane formulations were treated with various solvents to determine whether a single solvent could be utilized to efficiently demulsify. These results are reported below. Note that no single solvent was effective in rapidly demulsifying these liquid membrane formulations.

TABLE VII

DEMULSIFICATION BY SINGLE SOLVENT

Emulsions Tested:

| No. 1 | Surfactant Solution | = 1% Span-80, 4% polyamine of Example 1, 1% Lubrizol, 94% isoparaffin of Example 1, 120 g. |
|---|---|---|
| | Reagent Solution | = 20% $H_2SO_4$, 80% $H_2O$, 100 g. |
| | Feed Treated | = 0.036% $NH_3$, 1% diethanolamine, in water, 600 g. |
| No. 2 | Surfactant Solution | = 12% Lubrizol, 88% isoparaffin of Example 1, 120 g. |
| | Reagent Solution | = 30% $H_2SO_4$ in water, 100 g. |
| | Feed Treated | = Sour water (containing 2000 ppm $NH_3$ and some $H_2S$, pH = 7.5), 600 g. |
| No. 3 | Surfactant Solution | = 1% Span-80, 99% isoparaffin of Example 1, 120 g. |
| | Reagent Solution | = Water, 100 g. |
| | Feed Treated | = NH in water (pH = 10.7), 600 g. |
| No. 4 | Surfactant Solution | = 2% Span-80, 4% polyamine of Example 1, 94% isoparaffin of Example 1, 120 g. |
| | Reagent Solution | = 7.5% $(NH_4)_2 CO_3$, 100 g. |
| | Feed Treated | = 0.5 acetic acid, 600 g. |
| No. 5 | Surfactant Solution | = 20% polyamine of Example 1, 80% isoparaffin of Example 1, 120 g. |
| | Reagent Solution | = 1.5 $H_2SO_4$, 100 g. |
| | Feed | = 0.05% monoethanolamine in water, 600 g. |

| | Emulsion Tested | | | | |
|---|---|---|---|---|---|
| Solvent Tested | No. 1 | No. 2 | No. 3 | No. 4 | No. 5 |
| N-pentane | ND | — | — | PD | PD |
| N-hexane | ND | ND | ND | PD | PD |
| Cyclo-hexane | — | PD | ND | PD | PD |
| Acetone | CDAD | — | ND | — | CDAD |
| Gasoline | — | — | CDAD | — | — |
| Inhibisol | ND | ND | CDAD | — | — |
| Chloroform | PDAD | — | — | — | — |
| $CCl_4$ | PDAD | — | — | — | — |
| Dimethyl sulfoxide | ND | — | — | CDAD | ND |
| Ethyl acetate | — | CDAD | — | PD | CDAD |
| Oleic acid | PD | — | — | — | — |
| Sodium sulfosuccinic acid | — | CD | — | — | — |
| Isopropyl alcohol | — | ND | — | CDAD | ND |
| Methyl alcohol | — | ND | — | ND | Emulsified |
| Benzene | — | ND | — | ND | PD |
| Toluene | — | ND | — | PD | PD |
| Xylene | — | ND | — | ND | PD |
| Turpentine | — | PDAD | CDAD | PD | PD |
| Monoethanolamine | — | ND | — | — | — |
| Methylene chloride | — | CDAD | — | — | — |
| $NH_4OH$ Solution | — | — | — | ND | — |
| Acetic acid | — | — | — | PD | Emulsified |
| Formaldehyde | — | — | — | ND | — |
| Heptane | — | — | — | PD | PD |

What is claimed is:

1. In a liquid membrane process for removing a dissolved component from an aqueous feedstream which comprises contacting said feedstream with a water-in-oil emulsion which is characterized as having an exterior phase which is permeable by said dissolved component, an interior phase containing a reagent which reacts with said permeable dissolved component and converts said permeable dissolved component into a non-permeable form, the improvement which comprises contacting said water-in-oil emulsion with said aqueous feedstream for a time and at conditions sufficient to convert a substantial portion of said reagent to the reaction product of said reagent and said dissolved component, separating said water-in-oil emulsion from said aqueous feedstream, demulsifying said water-in-oil emulsion by (1) mixing the emulsion, at a volume ratio of from 1/9 to 9/1, with a mixture of two or more co-miscible volatile solvents, at least one of which is an alcohol or a ketone that is miscible with the water and at least one of which is a low boiling hydrocarbon or chlorinated hydrocarbon which is miscible with the oil, the weight ratio of said alcohol or ketone and hydrocarbon being from 1/9 to 9/1 and the oil miscible solvent further characterized as having a boiling point of at least 50°C less than the boiling point of the oil, under conditions of agitation, (2) terminating said agitation and allowing the mixture to separate into an oil and water layer, said water layer comprising substantially all of said reaction product and said unreacted reagent and said oil layer comprising substantially all of the components of the exterior phase of said emulsion, separating said oil and water layers, distilling off said oil miscible solvent from said oil layer, and recycling said oil back to an emulsification zone for use in preparing fresh emulsion.

2. The process of claim 1 further characterized by the step of separating said unreacted reagent from said water miscible solvent and recycling said unreacted reagent back to said emulsification zone for use in preparing fresh emulsion.

3. The process of claim 2 further characterized by recovering the reaction product of said reagent and said dissolved component, converting said reaction product to fresh reagent, and recycling said fresh reagent to said emulsification zone.

4. The process of claim 1 further comprising the step of distilling said water miscible solvent from said water layer, combining said distilled water miscible solvent with said distilled oil miscible solvent, and recycling said mixture to step (1) of said process.

5. The process of claim 1 wherein said oil miscible solvent is cyclohexane and said water miscible solvent is isopropanol.

6. The process of claim 1 wherein said miscible solvent is an alcohol.

7. The process of claim 6 wherein said alcohol is a $C_1$ to $C_4$ alcohol.

8. The process of claim 1 wherein said water miscible solvent is a ketone.

9. The process of claim 8 wherein said ketone is a $C_3$ to $C_5$ ketone.

* * * * *